United States Patent [19]

Furuya

[11] Patent Number: 5,101,503
[45] Date of Patent: Mar. 31, 1992

[54] METHOD OF CONNECTING CHANNELS OF DECENTRALIZED RADIO SYSTEMS

[75] Inventor: Yukitsuna Furuya, Tokyo, Japan

[73] Assignee: NEC Corporation, Japan

[21] Appl. No.: 465,320

[22] Filed: Jan. 16, 1990

[30] Foreign Application Priority Data

Jan. 18, 1989 [JP] Japan ................................. 1-10587

[51] Int. Cl.$^5$ .......................... H04Q 7/00; H04B 1/00
[52] U.S. Cl. ................................... 455/34; 455/56
[58] Field of Search ................ 455/33, 34, 54, 56, 455/62; 379/60, 63

[56] References Cited

U.S. PATENT DOCUMENTS 4,696,027  9/1987  Bonta ................................... 455/33

OTHER PUBLICATIONS

"A New Mobile Communication System using Autonomous Radio Link Control with Decentralized Base Stations" by T. Hattori et al., IEEE 1987 pp. 579–586.

Primary Examiner—Curtis Kuntz
Assistant Examiner—Christine K. Belzer
Attorney, Agent, or Firm—Ostrolenk, Faber, Gerb & Soffen

[57] ABSTRACT

In a method of connecting channels of a plurality of decentralized radio systems which perform independent channel connections, each of the plurality of radio systems sets a given channel and monitors a reception signal level of the given channel. Each radio system detects that the given channel is busy and sets a next channel when the reception signal level of the given channel is higher than a level corresponding to a threshold value. Each radio system rejects a connection if all channels are busy. Each radio system detects the given channel as an empty channel and starts communication through the given channel if the reception signal channel is lower than the level corresponding to the threshold value. Each radio system increases the threshold value when the channel connection is rejected. Each radio system decreases the threshold value when the communication is started.

4 Claims, 3 Drawing Sheets

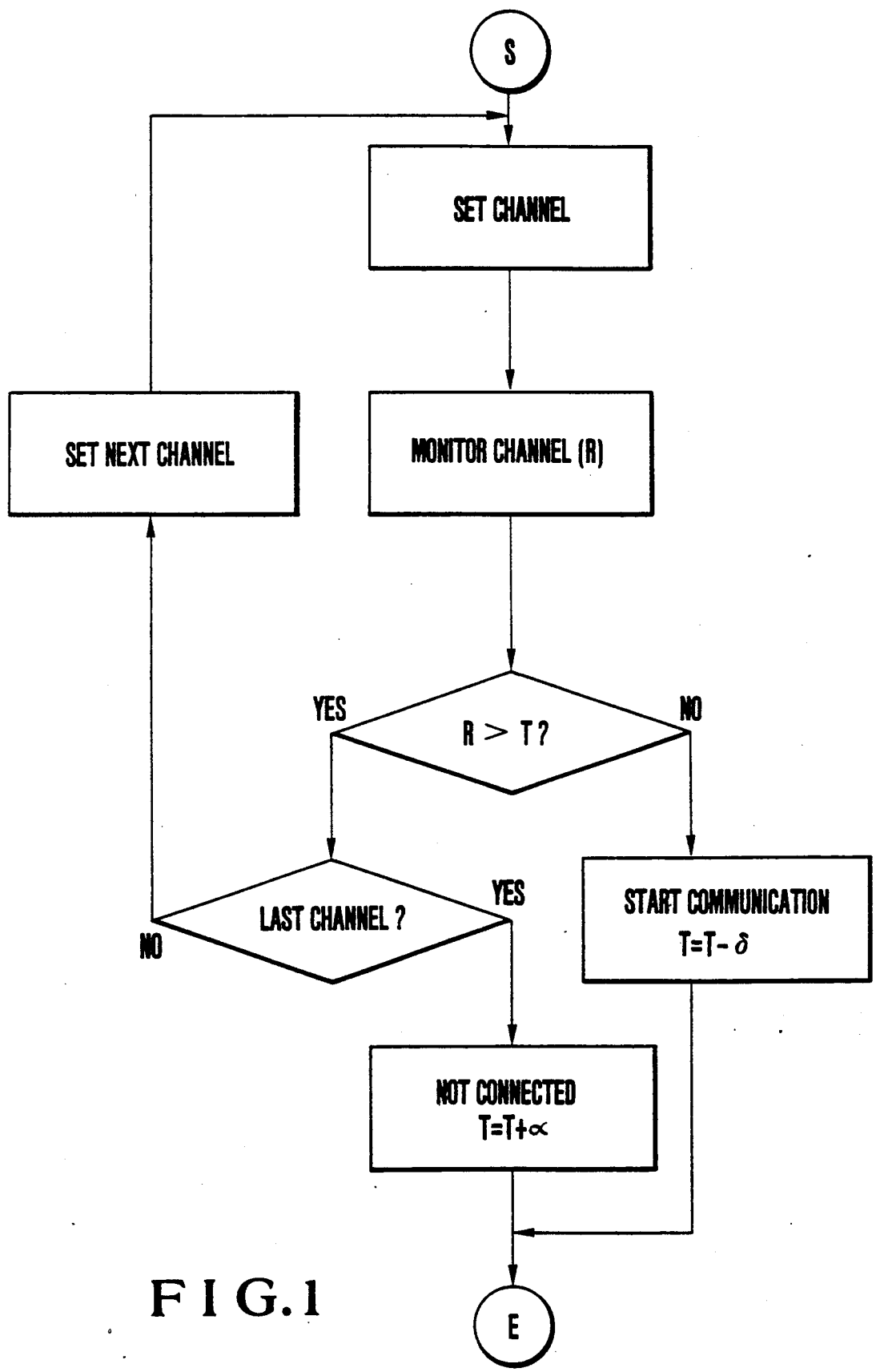
F I G. 1

METHOD OF CONNECTING CHANNELS OF DECENTRALIZED RADIO SYSTEMS

BACKGROUND OF THE INVENTION

The present invention relates to a method of allocating channels in radio communication systems, and more particularly, in decentralized radio systems such as cordless telephone systems.

A carrier sensing technique has been introduced in recent cordless telephone systems to prevent interference with other stations and to ensure that an empty channel will be used. According to this technique, a channel state is monitored prior to communication to measure the reception signal level of this channel. When the reception signal level is lower than that corresponding to a predetermined value, communication is started. Otherwise, another channel is monitored. In this case, there is no established theory for determining a carrier sensing threshold value, i.e., determining a predetermined value to be compared with the reception signal level so as to determine an empty channel.

This threshold value is a very important value to determine the capacity of the system and is preferably set to be an optimal value. Conditions for determining the threshold value in the initial period of system introduction are different from those after a period of widespread use of the system. That is, it is necessary to set a lowest sensing level and not to use channels used by other stations so as to prevent interference between the stations. However, when the number of stations and hence the traffic have increased, the system can no longer be practically operated if communication is not permitted to start in consideration of even a slight possibility of a collision. This problem will be described with reference to FIGS. 2A and 2B.

FIGS. 2A and 2B illustrate a relationship between distances of the mobile telephone sets from base stations and reception signal levels. Referring to FIG. 2A, the base stations are located at positions X1 and X2 and each have a transmission signal level T. A reception signal level of a mobile station is decreased when it is away from the transmission station. When a noise level is given as N, a carrier sensing threshold value is preferably set at a level slightly higher than the noise level N as indicated by a level C, in the initial period of system introduction. Assuming that a signal-to-noise ratio of Y will provide acceptable communications quality, the minimum required signal strength in that situation will be S. Therefore, when the interfering station is located at the position X2 sufficiently away from the mobile station, a maximum communication range for the mobile station can reach position D beyond which the reception signal level from the desired base station X1 is lowered and the reception characteristics are degraded by noise.

To the contrary, as shown in FIG. 2B, when the system is in widespread use and a distance between the mobile station and the interfering station X3 is reduced, the interfering signal level is increased. In FIG. 2B, the desired base station X1 and the interfering base station X3 are assumed to be closer than in FIG. 2A. When the carrier sensing threshold value is kept unchanged at a level C, no empty channel can be found, and an empty channel cannot be set. Even in this case, communication can be performed in the range near the base station (i.e., the range from X1 to D') without interference, because the reception signal level from X1 is sufficiently higher than, i.e., more than Y greater than, the interfering signal level from X3 within this range. Therefore, acceptable communication can be provided within the area from X1 to D' in FIG. 2B if the carrier sensing threshold is raised from C to C'.

SUMMARY OF THE INVENTION

It is an object of the present invention to provide decentralized radio communication systems capable of preventing interference by setting a small carrier sensing threshold value to prevent interference in the initial period of system introduction, and assuring an empty channel by increasing the threshold value when the number of subscribers and hence the number of systems have increased.

In order to achieve the above object of the present invention, there is provided a method of connecting channels of a plurality of decentralized radio systems which perform independent channel connections, comprising the steps of causing each of the plurality of radio systems to set a given channel and monitor a reception signal level of the given channel, causing each radio system to detect that the given channel is busy and to set a next channel when the reception signal level of the given channel is higher than a level corresponding to a threshold value, causing each radio system to reject a connection if all channels are busy, causing each radio system to detect the given channel as an empty channel and start communication through the given channel if the reception signal channel is lower than the level corresponding to the threshold value, causing each radio system to increase the threshold value when the channel connection is rejected, and causing the each radio system to decrease the threshold value when the communication is started.

When an empty channel cannot be found by carrier sensing for controlling a carrier sensing threshold value by decentralized control, the threshold value is increased. When an empty channel is found, the threshold value is decreased. As a matter of fact, a probability of failure of connections must be limited to several % or less. Therefore, an incrementing control amount of the threshold value is different from a decrementing control amount of the threshold value.

BRIEF DESCRIPTION OF THE DRAWINGS

FIG. 1 is a flow chart showing an algorithm of the present invention;

DESCRIPTION OF THE PREFERRED EMBODIMENT

FIG. 1 shows a method of the present invention and more specifically an algorithm which is executed in a mobile or base station. In this embodiment, the algorithm is applied to the mobile station. When a channel connection request is detected, the mobile station sets the first channel and monitors it. If a reception signal level is detected as R as a result of monitoring, the mobile station compares the reception signal level R with a threshold value T. If the level R is higher than a level corresponding to the threshold value T, the mobile station determines that the first channel is busy. The mobile station then sets the next channel and repeats the same operation as described above. When the mobile station determines that all channels are busy, the channel connection is rejected (in case of a telephone set, a busy tone is repeated). At the same time, the mobile station increases the threshold value T by α. If any channel satisfying the condition that R is lower than T is found, this channel is detected as an empty channel, and communication is started through this channel. At the same time, the threshold value is decreased by δ. The threshold value T is decreased under this control when communication is successfully performed. However, when all the channels are busy, the threshold value is increased. Therefore, when systems which use identical frequencies are not present near this mobile station, the threshold value is gradually decreased and becomes almost the noise level. If the level of the threshold value is lower than the noise level, the mobile station detects that all the channels are busy, and therefore the threshold value is increased. For example, when the value α is set to be 30 times the value δ, the channel connection cannot be performed once in 30 times, and recalling is performed. However, when the number of systems is increased, and the number of channels is substantially limited, a loss of the ability to call occurs even with a higher threshold value.

Figure 2A:
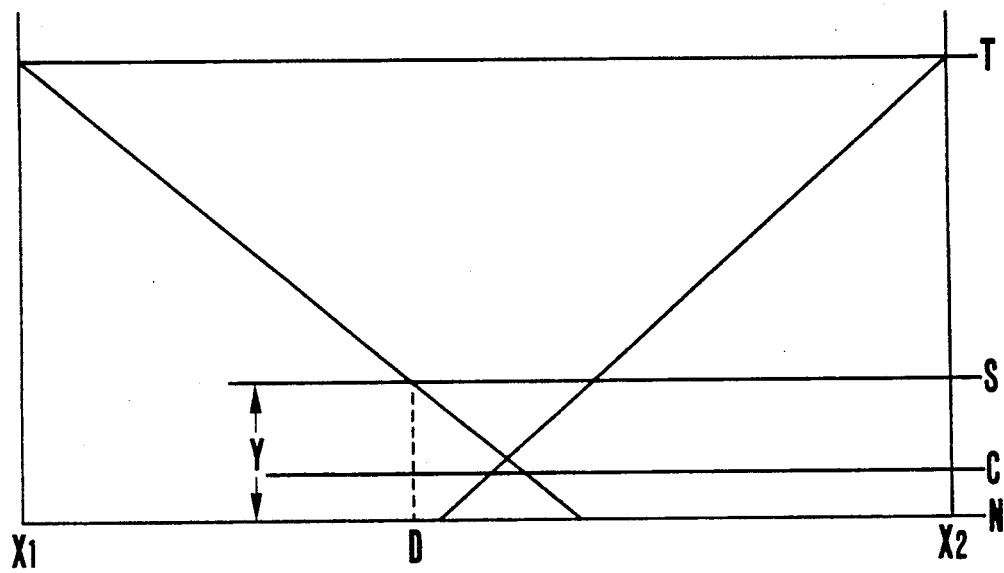
FIGS. 2A and 2B are signal reception charts for explaining an operation of the overall system.
Figure 2B:
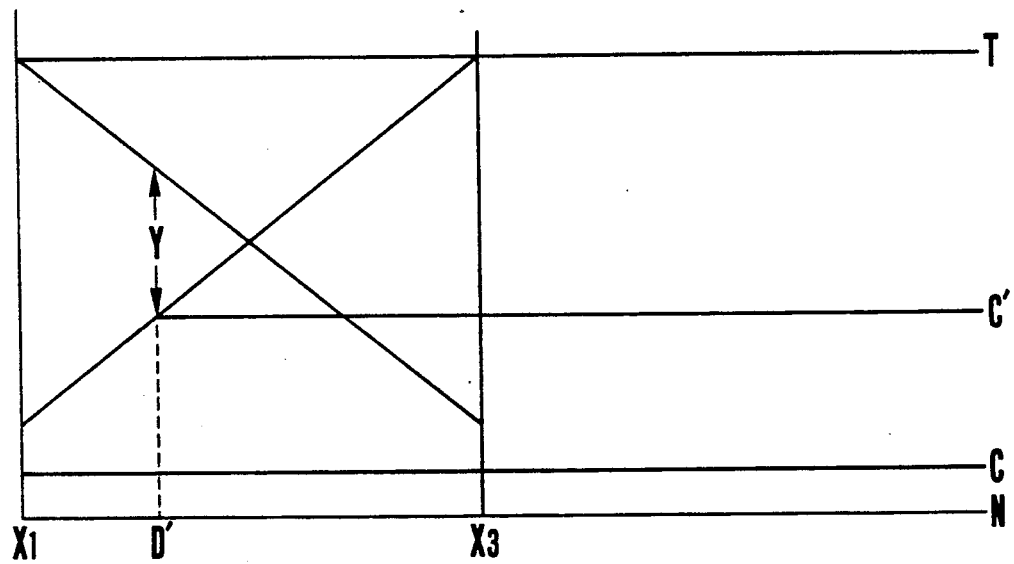

Thus, the threshold value is set to be a higher level, and the state shown in FIG. 2B is realized.

It is possible to set the upper and lower limits of the threshold value and to vary the threshold value within the range between the upper and lower limits. In this case, the threshold value cannot be smaller than a value corresponding to the noise level. The above algorithm can be used in the base station. This algorithm may also be constituted by programs in the base and mobile stations. It is therefore seen that a beneficial effect can be obtained by changing the values of α and δ dynamically, such as changing them as functions of an iteration number or changing them as functions of the value T.

Figure 3:
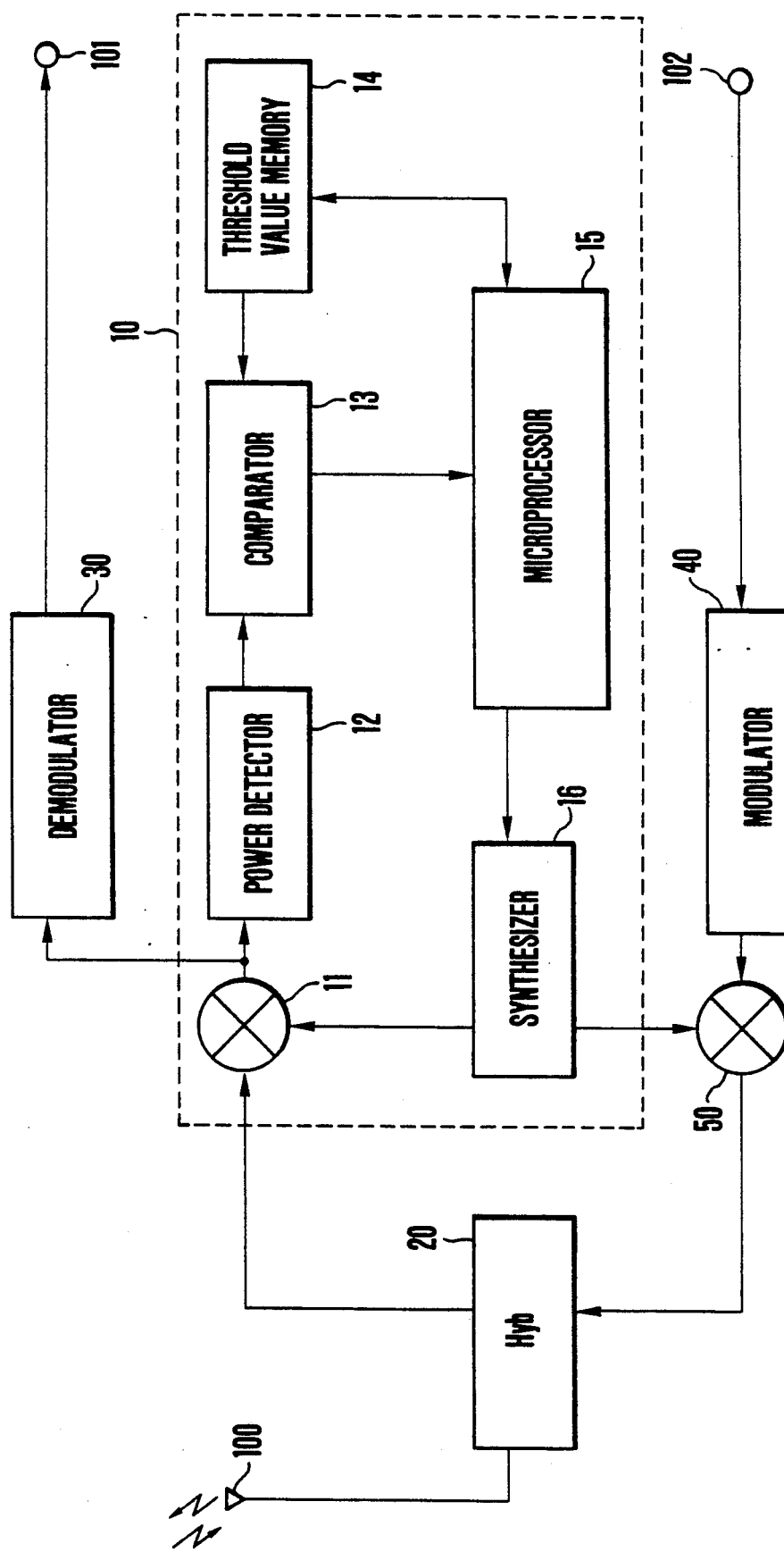
FIG. 3 is block diagram showing an arrangement of a radio unit which employs a method of the present invention.

FIG. 3 shows an embodiment of the present invention. This embodiment exemplifies an arrangement of a radio unit. A part associated with the present invention is represented by a part 10, and the part 10 will be mainly described. A signal received from an antenna 100 is input to a mixer 11 through a hybrid circuit (Hyb) 20. The input signal is multiplied with a carrier signal from a synthesizer 16 by the mixer 11 and is converted into an IF signal. The IF signal is converted into a signal level by a power detector 12 and is compared by a comparator 13 with a threshold value stored in a threshold value memory 14. A microprocessor 15 changes a frequency of the synthesizer 16 or changes the threshold value stored in the threshold value memory 14 on the basis of the comparison result. The algorithm is shown in FIG. 1. At the same time, the IF signal is demodulated by a demodulator 30, and the demodulated signal appears at a terminal 101. A signal input from a terminal 102 is modulated by a modulator 40 and converted into an RF signal by a mixer 50. The RF signal is transmitted from the antenna 100 through the hybrid circuit 20.

As described above, according to the present invention, there is provided a flexible method of connecting channels of decentralized radio systems, wherein a smaller threshold value shown in FIG. 2A to prevent interference is obtained when the number of systems is small, and a larger threshold value shown in FIG. 2B is obtained to prevent a total inability to call when the number of systems is increased with respect to the number of channels.

What is claimed is:

1. A method of connecting channels of a plurality of decentralized radio systems which perform independent channel connections, comprising the steps of:

causing each of the plurality of radio systems to set a given channel and monitor a reception signal level of the given channel;

causing said each radio system to detect that said given channel is busy and to set a next channel when the reception signal level of said given channel is higher than a level corresponding to a threshold value;

causing said each radio system to reject a connection if all channels are busy;

causing said each radio system to detect said given channel as an empty channel and start communication through said given channel if the reception signal channel is lower than the level corresponding to the threshold value;

causing said each radio system to increase the threshold value when the channel connection is rejected; and causing said each radio system to decrease the threshold value when the communication is started.

2. A method as in claim 1, wherein the radio system increases the threshold value by an incrementing amount which is different from a decrementing amount by which the radio system decreases the threshold value.

3. A method as in claim 2, wherein the incrementing amount is greater than the decrementing amount.

4. A method as in claim 3, wherein the incrementing amount is about 30 times the decrementing amount.

* * * * *